US012726384B2

(12) United States Patent
Küchler et al.

(10) Patent No.: US 12,726,384 B2
(45) Date of Patent: Sep. 1, 2026

(54) DEVICE WITH STEERING AND CHANNEL STITCHING FOR AN EXTENDED BANDWIDTH

(71) Applicant: NXP B.V., Eindhoven (NL)

(72) Inventors: Wolfgang Küchler, Graz (AT); Michael Rath, Graz (AT)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 18/906,053

(22) Filed: Oct. 3, 2024

(65) Prior Publication Data

US 2025/0125995 A1 Apr. 17, 2025

(30) Foreign Application Priority Data

Oct. 12, 2023 (EP) .................................... 23203273

(51) Int. Cl.
*H04L 25/02* (2006.01)
*H04B 17/11* (2015.01)
*H04B 17/21* (2015.01)

(52) U.S. Cl.
CPC .......... *H04L 25/0204* (2013.01); *H04B 17/11* (2015.01); *H04B 17/21* (2015.01); *H04L 25/0212* (2013.01)

(58) Field of Classification Search
CPC . H04L 25/02; H04L 25/0202; H04L 25/0204; H04L 25/0212; H04L 45/24; H04L 45/245; H04B 17/10; H04B 17/11; H04B 17/20; H04B 17/21; H04B 1/69;
(Continued)

(56) References Cited

U.S. PATENT DOCUMENTS 3,599,142 A 8/1971 Rust
4,385,377 A 5/1983 Norris et al.
4,683,474 A 7/1987 Randig
(Continued)

FOREIGN PATENT DOCUMENTS

CN 103630878 A 3/2014
CN 11400421 A 3/2022
(Continued)

OTHER PUBLICATIONS

EP Application No. 23203265.6, Not yet Published; 21 pages (Oct. 12, 2023).

(Continued)

*Primary Examiner* — James M Perez

(57) ABSTRACT

An RF device includes a first channel with a first frequency band, configured to receive a first signal; and a second channel with a second frequency band, configured to receive a second signal. The first frequency band and the second frequency band are different. The device includes control circuitry configured to obtain a first channel response associated with the received first signal at the first channel, to obtain a second channel response associated with the received second signal at the second channel and to calibrate the first channel response and the second channel response by steering to a calibration base. The control circuitry is further configured to calibrate the first channel response and second channel response by channel stitching to obtain a combined channel response.

20 Claims, 7 Drawing Sheets

(58) Field of Classification Search
CPC .............. H04B 1/7163; H04B 1/71637; H04B 1/7183; H04B 1/719
See application file for complete search history.

(56) References Cited

U.S. PATENT DOCUMENTS 5,473,332 A 12/1995 James et al.
6,128,276 A * 10/2000 Agee ....................... H04L 5/026 370/335
6,965,341 B1 11/2005 Cho et al.
6,989,782 B2 * 1/2006 Walker .................. G01S 13/284 342/134
7,564,400 B2 7/2009 Fukuda
7,672,221 B2 * 3/2010 Fuji ..................... H04L 27/2662 370/208
7,773,028 B2 8/2010 Chan et al.
7,873,326 B2 1/2011 Sadr
7,889,781 B2 * 2/2011 Li ........................... H04L 7/033 370/335
7,965,761 B2 6/2011 Shattil
7,983,323 B2 * 7/2011 Kent .................... H04B 1/7115 375/349
8,169,358 B1 * 5/2012 Bourdelais .............. G01S 13/74 342/52
8,610,521 B2 * 12/2013 Degner .................. H01H 50/18 335/106
8,805,297 B2 * 8/2014 Hanevich ............... H04B 1/001 455/73
8,861,327 B2 10/2014 Prothero et al.
9,638,793 B2 5/2017 Wang et al.
9,660,759 B2 * 5/2017 Waheed .............. H04L 27/2601
9,864,045 B2 1/2018 Fairley
9,945,933 B2 4/2018 Ding
10,164,670 B2 * 12/2018 Dark .................. G01R 19/2509
10,327,221 B1 * 6/2019 Sarrigeorgidis .... H04L 25/0212
10,499,856 B2 12/2019 Fung et al.
10,537,288 B2 1/2020 Fung et al.
10,623,075 B2 4/2020 Pratt et al.
10,623,121 B1 * 4/2020 Satrasala ............... H04W 24/08
10,627,483 B2 4/2020 Rao et al.
10,718,863 B2 7/2020 Carswell et al.
10,771,281 B1 9/2020 Suchy et al.
10,884,114 B2 1/2021 Fukushima et al.
11,095,327 B2 * 8/2021 Wu ..................... H04L 25/0244
11,378,649 B2 7/2022 Rao et al.
11,381,329 B2 * 7/2022 Tertinek ............... H04B 17/364
11,408,978 B2 8/2022 Wang et al.
11,592,548 B2 2/2023 Kesaraju et al.
11,950,585 B2 4/2024 Guan et al.
12,052,051 B2 * 7/2024 Tertinek ............. H04B 1/71637
12,052,121 B2 * 7/2024 Yerramalli .......... H04W 64/003
12,061,249 B1 8/2024 Loui et al.
12,066,529 B2 8/2024 Vollbracht et al.
12,328,152 B2 * 6/2025 Hewavithana ...... H04L 25/0222
12,429,571 B2 9/2025 Sharpe et al.
2003/0161390 A1 * 8/2003 Teague ................. H04B 1/7117 375/E1.032
2004/0139466 A1 * 7/2004 Sharma ................ H04B 1/7113 725/62
2005/0243898 A1 * 11/2005 Reznik ............... H04B 1/70754 375/147
2007/0110130 A1 * 5/2007 Kang ................. H04B 1/70758 375/E1.006
2008/0012710 A1 1/2008 Sadr
2008/0136704 A1 6/2008 Chan et al.
2009/0074031 A1 3/2009 Fukuda
2009/0110033 A1 4/2009 Shattil
2011/0305288 A1 * 12/2011 Liu ..................... H04L 25/0204 375/295
2012/0263031 A1 10/2012 Prothero et al.
2014/0105256 A1 4/2014 Hanevich et al.
2014/0197984 A1 7/2014 Wang et al.
2014/0269882 A1 * 9/2014 Thompson ............ H04L 25/025 375/232
2014/0269883 A1 * 9/2014 Thompson .......... H04L 25/0216 375/232
2014/0295877 A1 * 10/2014 Hart ........................ H04W 4/06 455/456.1
2015/0293209 A1 10/2015 Fairley
2016/0157783 A1 6/2016 Fung et al.
2016/0227516 A1 * 8/2016 Nallampatti Ekambaram ............ H04L 27/2659
2017/0023662 A1 1/2017 Ding
2017/0265816 A1 9/2017 Fung et al.
2017/0338874 A1 11/2017 Pratt et al.
2017/0359134 A1 * 12/2017 Baier .................. H04L 25/0224
2018/0011170 A1 1/2018 Rao et al.
2018/0031695 A1 2/2018 Carswell et al.
2018/0069576 A1 * 3/2018 Dark ..................... H04L 7/0029
2018/0070357 A1 * 3/2018 Feinmesser ........... H04W 64/00
2018/0254910 A1 * 9/2018 Dutz ................. H04W 12/0431
2018/0335518 A1 11/2018 Fox
2019/0101635 A1 4/2019 Fukushima et al.
2020/0025906 A1 1/2020 Kesaraju et al.
2020/0209352 A1 7/2020 Rao et al.
2020/0295972 A1 * 9/2020 Hemo ................. H04L 25/0212
2020/0300972 A1 9/2020 Wang et al.
2022/0141076 A1 * 5/2022 Hammerschmidt .. H04L 5/0098 375/262
2022/0187450 A1 6/2022 Vollbracht et al.
2023/0088441 A1 * 3/2023 Tertinek ................ G01S 13/003 375/147
2023/0291610 A1 * 9/2023 Pakrooh ................ H04W 52/52
2024/0073072 A1 * 2/2024 Duan ..................... H04B 17/30
2024/0085552 A1 * 3/2024 Kim ...................... G01S 13/878
2024/0183965 A1 6/2024 Sharpe et al.
2024/0353550 A1 10/2024 Loui et al.
2024/0380641 A1 * 11/2024 Pakrooh .............. H04L 25/0212
2025/0125995 A1 * 4/2025 Küchler .................. G01S 13/06
2025/0374032 A1 * 12/2025 Lorca ................... H04B 7/0456

FOREIGN PATENT DOCUMENTS

EP 3507954 B1 10/2021
KR 102289882 B1 8/2018

OTHER PUBLICATIONS

Li, Zhi et al; "Sidelobe Reduction for UWB Radar Imaging Based on Spatial Spectrum Coherence Factor"; IEEE Int'l Conf. on Communication Technology, Xi'an, CN; pp. 1600-1604 (Oct. 2019).
U.S. Appl. No. 18/647,696; Not yet Published; 32 pages (Apr. 26, 2024).
Ji, Yilin et al; "Enabling High-Fidelity Ultra-Wideband Radio Channel Emulation: Band-Stitching and Digital Predistortion Concepts"; IEEE Open Journal of Antennas and Propagation, vol. 3; pp. 932-939; (Aug. 2022).
U.S. Appl. No. 18/906,080 Non-Final Office Action issued on Jun. 26, 2026; 12 pages.

* cited by examiner

B = 0.5 GHz
121
122
123
124
6.5 GHz
7.0 GHz
7.5 GHz
8.0 GHz
115
B = 2.0 GHz
130
Amplitude
Path Length in meter
$f_c$ = 6.5 GHz
$f_c$ = 7 GHz
stitch (corrected)
no stitch (quadruple)

$B_1$ = 0.5 GHz
$B_2$ = 1.0 GHz
140
6.5 GHz
7.25 GHz
gap
8.0 GHz
$f_c$ = 6.5 GHz
$f_c$ = 7.2 GHz
stitch (corrected)
no stitch (quadruple)

DEVICE WITH STEERING AND CHANNEL STITCHING FOR AN EXTENDED BANDWIDTH

CROSS-REFERENCE TO RELATED APPLICATIONS

This application claims the priority under 35 U.S.C. § 119 of European patent application no. 23203273.0, filed Oct. 12, 2024 the contents of which are incorporated by reference herein.

TECHNICAL FIELD

The present disclosure relates to a radio frequency (RF) device with at least two channels, each for a different bandwidth (frequency range). In particular, the device comprises a control device configured to calibrate a received signal from a first channel and a further received signal from a second channel by steering to a calibration base and to combine the signals then by channel stitching. The disclosure further relates to a method of operating such a device. The disclosure may hence relate to the technical field of RF devices, in particular ultra-wideband (UWB) radar applications.

BACKGROUND

Radio frequency (RF) signals/waves are applied for communications as well as to determine spatial properties such as position, distance, angle, or velocity of a target (object or person or vehicle of interest). For example, in a radar applications, a transmitter emits an RF signal towards the target, while one or more receivers obtain a reflection (an echo) of the RF signal that has been reflected by the target. For example, the ultra-wideband (UWB) wireless technology enables secure, accurate ranging with less than 5 cm accuracy, and can also be utilized as a radar device for receiving reflected signals from a target. For example, an UWB device can be used as an impulse radar, where a short duration pulse is transmitted, and its reflection is received. This reflection is captured as change in the channel impulse response (CIR) measured by the receiver. However, the performance of an RF device/system may be generally limited by the bandwidth, for example in the case of UWB radar systems to the range of 0.5 to 1 GHz (for standardized IEEE channels).

FIG. 8 illustrates a channel response from a conventional radar device, here an impulse UWB device. The y-axis shows the amplitude and the x-axis shows the path length (of the radar signal) in meters. The channel impulse response measurements with UWB pulses exhibit generally a high time resolution, and the measured peaks to estimate ranges, e.g. to one or more targets and/or surfaces. In the present example, three dominant peaks $d_o$, $d_1$, and $d_2$ can be identified (multitap channel). The accuracy and resolution of the peak position is tied to steepness of the respective slope (i.e., pulse width). As a benchmark for the estimation of the accuracy, the Cramer-Rao lower bound may be applied, whereby a higher bandwidth may decrease variations.

In many applications such as UWB, the bandwidth is nevertheless limited, e.g. by the applied standard. In the present example, the standardized UWB bandwidth of B=500 MHz for a single channel 121 has been applied. In the present example, it can be seen that for the bandwidth of 500 MHz, the resolution and accuracy may be not satisfactory. One would like to use the largest bandwidth possible, however this may be limited by hardware and standardization.

SUMMARY OF THE DISCLOSURE

There may be a need to provide a RF device with an extended bandwidth in an efficient and reliable manner. An RF device, a method, and a method of using are provided.

According to an aspect of the present disclosure, it is described an RF device (e.g. a radar device, in particular a UWB device), comprising:

- i) a first channel (for example channel 5 of the UWB standard) with a first frequency band (e.g. with a center frequency at 6.5 GHZ), configured to receive a (RF) first signal (e.g. a first reflection of a first radar signal from a transmitter);
- ii) a second channel (for example channel 9 of the UWB standard; in particular adjacent or non-adjacent to the first channel) with a second frequency band (e.g. with a center frequency at 8 GHz), configured to receive a (RF) second signal (e.g. second reflection of a second radar signal from the transmitter) (the first signal and the second signal may be similar or different), wherein the first frequency band and the second frequency band are different (overlapping or non-overlapping); and
- iii) a control device (e.g. a processor, a chip, an integrated circuit, etc.), configured to:
  - a) obtain a first channel response (in particular a first channel impulse response and/or a first spectrum) associated with the received first signal at the first channel;
  - b) obtain a second channel response (in particular a second channel impulse response and/or a second spectrum) associated with the received second signal at the second channel;
  - c) calibrate (align, bring into coherence) the first channel response and the second channel response by steering (the first channel response and/or the second channel response) to a calibration base (in particular a dominant peak/tap/phase/position; in particular present in the first channel response and the second channel response); and
  - d) combine the (calibrated) first channel response and second channel response by channel stitching (band stitching, in particular a subsequent coherent combination) to obtain a combined channel response (a combined spectrum).

According to a further aspect of the present disclosure, it is described a method of operating an RF device (e.g. as described above), the method comprising:

- i) obtaining a first channel response associated with a received first signal at a first channel with a first frequency band;
- ii) obtaining a second channel response associated with the received second signal at a second channel with a second frequency band, wherein the first frequency band and the second frequency band are different;

- iii) calibrating the first channel response and the second channel response by steering to a calibration base; and
- iv) combining the (calibrated) first channel response with the second channel response for obtaining a combined channel response, wherein combining comprises channel stitching.

According to a further aspect of the present disclosure, it is described a use (method of using) of steering to a calibration base to calibrate (align) channels with non-adjacent frequency bands in channel stitching.

In the present context, the term "channel stitching" (or band stitching or spectral stitching) may in particular refer to a process, where multiple pass band signals are combined. Preferably, the stitching may comprise a subsequent and coherent combination of channel impulse responses with different frequency bands.

According to an exemplary embodiment, the present disclosure may be based on the idea that an RF device with an extended bandwidth can be provided in an efficient and reliable manner, when the bandwidth is increased by channel stitching the channel responses of two or more (adjacent or non-adjacent) channels of said device, and when the channel responses of said channels are aligned with respect to a calibration base. The calibration base may be for example a dominant peak and/or a target peak present in all of the channel responses to be combined. A steering may be done towards said calibration base to obtain coherence (in particular at the calibration base region) of the channels to be combined. In this manner, the bandwidth may be increased significantly (e.g. four times), while the accuracy/resolution may be highly increased, see for example FIG. 8. Furthermore, even non-adjacent channel responses may be efficiently stitched in the described manner.

The aspects defined above and further aspects of the disclosure are apparent from the examples of embodiment to be described hereinafter and are explained with reference to these examples of embodiment. The disclosure will be described in more detail hereinafter with reference to examples of embodiment but to which the disclosure is not limited.

EXEMPLARY EMBODIMENTS

According to an embodiment, the first frequency band and the second frequency band are adjacent (neighboring) to each other. In particular, there may be no further frequency band (or channel) in between. In an embodiment, the first channel and the second channel are adjacent channels, for example such as channel 5 and channel 6 of the IEEE standard (for example IEEE 802.15.4-2020, in particular Chapter 15.4.1). In an example, further bandwidths of further channels may also be adjacent. Thereby, an especially efficient channel stitching may be enabled using an existing architecture.

According to an embodiment, the first frequency band and the second frequency band are non-adjacent to each other. In particular, there may be a further frequency band (or channel) in between. In an embodiment, the first channel and the second channel are non-adjacent channels, for example such as channel 5 and channel 9 of the IEEE standard. In an example, further bandwidths of further channels may also be adjacent or non-adjacent to the first channel and/or the second channel. Thereby, an especially efficient channel stitching may be enabled using an existing architecture even in case that channels are not directly adjacent.

According to an embodiment, the first frequency band and the second frequency band have a frequency gap in between. As described above, the first frequency band and the second frequency band can be non-adjacent. In this case, a gap would be present between said two frequency bands. For example, the first frequency band may be 500 MHZ, centered at 6.5 GHz and the second frequency band may be also 500 MHz, centered at 8 GHz. Then, a gap of 500 MHz would be in between.

According to an embodiment, the device is an ultra-wideband (UWB) radar device. Thereby, an established and economically important standard can be directly applied.

In the context of the present document, the term "ultra-wideband" may refer to a radio technology that can use a very low energy level for short-range, high-bandwidth communications over a large portion of the radio spectrum. UWB may refer to a technology for transmitting information spread over a large bandwidth (e.g. 500 MHz). UWB may be defined as an antenna transmission for which emitted signal bandwidth exceeds the lesser of 500 MHz or 20% of the arithmetic center frequency. UWB transmissions may transmit information by generating radio energy at specific time intervals and occupying a large bandwidth. The range of UWB may be for example in the range of tens of meters. An UWB (RF) ranging system may employ the Time-of-Flight principle to determine the distance between a mobile device and a target device (e.g. a car to be opened) and/or anchor devices (markers) on the target device. Usually, a transceiver's transmitter sends out a waveform, commonly a chirp or a pulse, which is either reflected by an object or retransmitted by a second transceiver. Based on the amount of time it takes for the reflection or retransmission to reach the originating transceiver's receiver, the distance between the objects can be calculated. The so determined range between the receiver and the transmitter is then used as a control point (to enable access). In the same manner, payload may be transferred using UWB.

In the present context, "UWB" may include impulse-radio-ultra-wideband (IR-UWB) (see for example the standards IEEE802.15.4a and IEEE802.15.4z). In another embodiment, another RF scheme (in particular according to a standard) may be applied, for example based on WiFi, Bluetooth, NFC, RFID, etc.

According to an embodiment, the calibration base refers to at least one of: a dominant peak;

the most dominant peak; a dominant multipath component; a target peak; a self-interference peak. Thus, the calibration base may be chosen efficiently and in a flexible manner depending on the desired application.

In the present context, a "dominant peak" may be either the highest/strongest peak in a CIR or one of the highest/strongest peaks (e.g. one of the three most dominant) in said CIR. In an example, the calibration base is present in each of the channel responses applied for the calibration/stitching (multipath).

In the context of the present document, the term "target" may refer in particular to an entity (e.g. an object, a person, an animal, etc.) to be investigated, e.g. by radar, in particular regarding a spatial characteristic such as a position, a speed, etc. Accordingly, a "target peak" may be a detected response signal caused by a reflection of a transmitted RF signal from the target. For example, a CIR may be calculated from the reflection of the RF signal and the target peak may be one or more peaks in the CIR that result from the reflection at the target. Based on said target peak, the target phase (phase of the received reflected RF signal) may be determined.

According to an embodiment, the first channel response comprises a first self-interference peak and/or the second channel response comprises a second self-interference peak (see e.g. FIG. 6). In particular, the calibration/alignment process comprises: align the first self-interference peak and the second self-interference peak. In other words: calibrate the first channel response and the second channel response based on a first phase of the first self-interference peak and/or a second phase of the second self-interference peak.

Hereby, the phases (the phase offsets) of the CIRs may be aligned based on the self-interference peaks/phases.

In the context of the present document, the term "self-interference" may refer to a signal that is not caused by the target, but rather from a signal interference within the (radar) device. An example may be the interference between the transmitter and the receiver of said radar device. Such a self-interference may also be termed spill-over, cross-coupling, cross-talk, etc. A specific example of a self-interference is shown in FIG. 6. Within a CIR, one or more self-interference peaks may be visible. Based on one or more self-interference peaks, a self-interference phase may be determined based on which a calibration may be done.

According to an embodiment, calibration is performed to correct a constant phase offset and/or a steering phase offset between the first channel response and the second channel response. According to an embodiment, steering is performed to center a first phase of the first channel response and a second phase of the second channel response to obtain a coherence of the first channel response and the second channel response.

According to an embodiment, the control device is further configured to: process at least one of the first channel response, the second channel response, the combined channel response. Using one or more processing schemes, the device output quality (in particular resolution/accuracy) may be further improved. In a preferred example, the processing may reduce/minimize side lobes next to a main lobe in a CIR. In an example, a pre-processing and/or a post-processing may be performed, e.g. based on (spectral) filtering.

According to an embodiment, the device comprises three or more channels, wherein two or more channels are adjacent and/or wherein two or more channels are non-adjacent. This scheme may enable a flexible combination of channels.

According to an embodiment, the device further comprises a receiver to receive the signal, wherein the receiver comprises the first channel and the second channel. According to an embodiment, the device comprises i) a transmitter to transmit the (first and/or second) signal, and ii) a receiver to receive a reflection (of the one or more targets) of the signal.

In an example, the receiver comprises the first channel and the second channel. In an example, the receiver comprises a first receiver unit with the first channel and a second receiver unit with the second channel. Thereby, an RF device such as a radar device may be provided in a straightforward manner.

According to an embodiment, at least one of the first self-interference peak/phase and the second self-interference peak/phase is at least partially generated by a coupling between the transmitter and the receiver. According to an embodiment, the transmitter is associated with the receiver. According to an embodiment, the transmitter and the receiver share a common antenna. According to an embodiment, the transmitter and the receiver are implemented in the same unit or in different units. According to an embodiment, the transmitter and the receiver are co-located.

According to an embodiment, there is described a system, comprising:

i) an RF device as described above; and ii) a target from which the radar (RF) signal is reflected, wherein the target is a mobile target or an immobile target.

According to an embodiment, the first channel response is a first channel impulse response (CIR). According to an embodiment, the second channel response is a second CIR. According to an embodiment, the first channel response is associated with a first spectrum. According to an embodiment, the second channel response is associated with second spectrum. According to an embodiment, the combined channel response is associated with a combined spectrum.

According to an embodiment, the channels are configured in accordance with an IEEE standard. For example IEEE 802.15.4-2020, Chapter 15.4.1, wherein an RF requirements of the HRP UWB PHY standard is described.

According to an embodiment, the calibration phase (in particular a dominant peak/phase) is associated with a target, in particular wherein at least one property (e.g. location, speed, size, type) of the target is known. Thereby, an efficient steering to the target peak (which needs the highest resolution/accuracy) may be enabled.

According to an embodiment, the method further comprises: applying the combined channel response to determine a spatial characteristic. Thereby, spatial characteristics may be determined in an efficient and reliable manner. Spatial characteristic may include location/position of the target in space, distance to the target, number of targets, speed of target, etc. Methods such as time difference of arrival (TDoA) or angle of arrival (AoA) may be hereby applied.

According to an embodiment, by calibration and steering, (UWB) sub-bands may be coherently combined even for non-adjacent bands. According to an embodiment, sweeping of these bands may be detected, especially if non-adjacent bands are used (like in the above example with channel 5 and 9).

According to an embodiment, the control device is further configured to, in case that in the first channel response and/or in the second channel response (and/or the combined channel response), the first peak (e.g. target peak) is not the strongest peak (highest and/or broadest peak, most dominant peak): identify the strongest peak (acquisition path), define a calibration base window based on the identified strongest peak (in particular in the channel response before the strongest peak), and iteratively steer over the calibration base window to identify the first peak (first path). Thereby, an efficient calibration may be done based on the peak of interest (first peak, target peak), whereby distortion is avoided.

In other words, the acquisition path is the strongest component of the CIR, while the first path is the physical earliest component, which may not necessarily be the strongest, e.g. due to line-of-sight blockage and/or diffuse multipath propagation. When the strongest peak is chosen as the calibration base and steering is done towards said strongest peak, the actual peak of interest (in particular the first peak) may be distorted and thus weaker (see e.g. FIG. 5). The calibration base window may be chosen to be located timely before the strongest peak.

It can be iterated e.g. over the CIR taps before the acquisition path, in particular using a specific threshold. Thereby, the first peak may be identified and the distortion can be resolved.

DETAILED DESCRIPTION OF THE DRAWINGS

Figure 1:
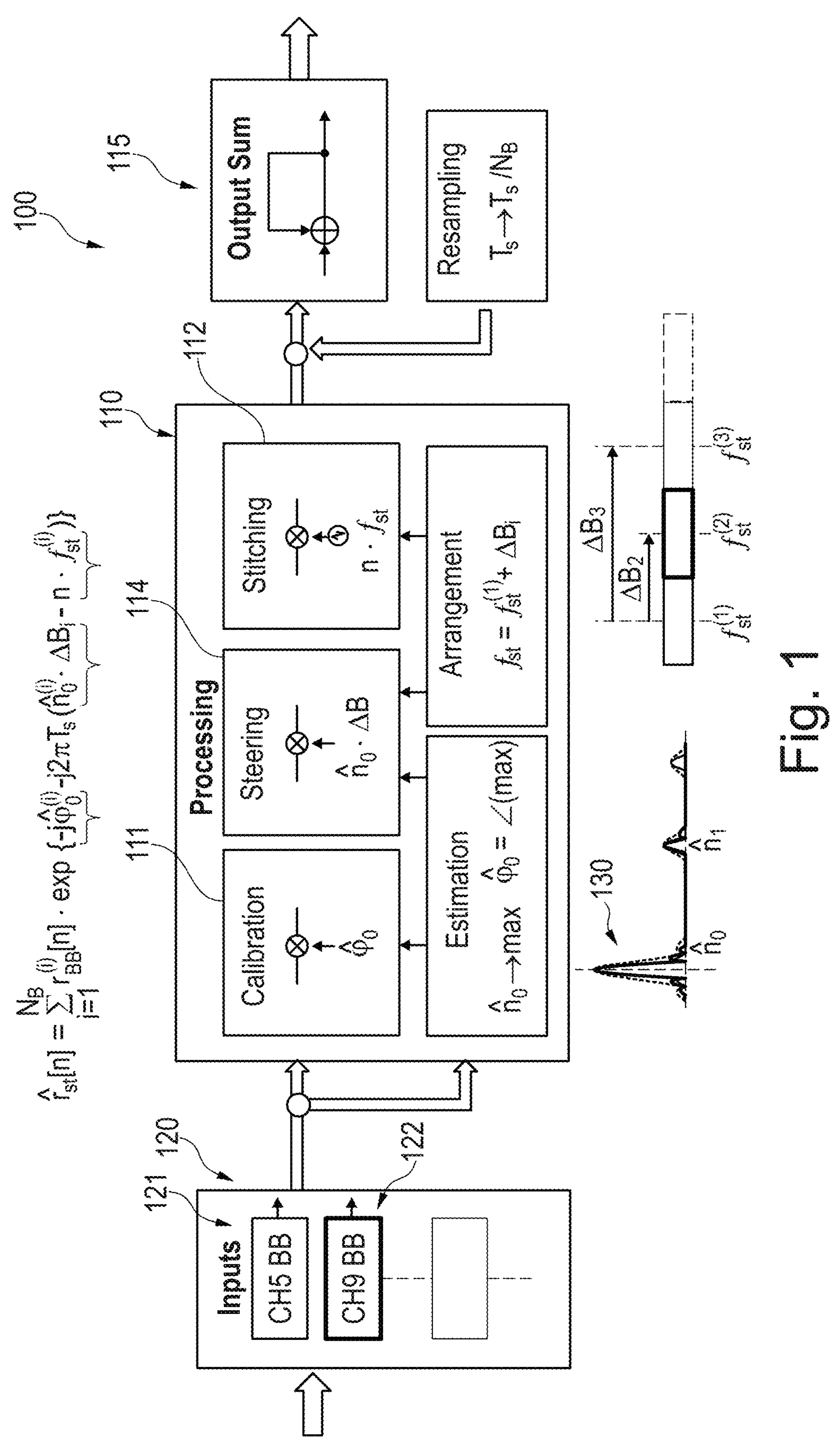
FIG. 1 illustrates an RF device, according to an exemplary embodiment of the disclosure.

Before referring to the drawings, embodiments will be described in further detail, some basic considerations will be summarized based on which embodiments of the disclosure have been developed.

According to an exemplary embodiment, multiple (UWB) sub-band channel measurements in base-band are processed consecutively in the following blocks:

1) correct constant phase offset if present (due to hardware effects),
2) apply steering phase offset (only required if step 1) is needed),
3) apply linear phase to shift to stitching band.

After running through these blocks, the signals are added together to obtain the output signal.

According to an exemplary embodiment, a further preprocessing block can be required for blocks 1) and 2), where the initial strongest multipath component is estimated (calibration base) to obtain:

i) an accurate estimate of the phase offset, and
ii) a coarse estimate of the delay of the strongest path.

The latter is used in step 2) to recover the propagation channel dependent phase rotation. For monostatic radar systems, the accuracy of this preprocessing block can be optional, since there is a deterministic self-interference component that can be leveraged for the estimators. In case of spectral gaps between the sub-bands, stitching coherency can be only given for the calibration/steering base (in the vicinity of the strongest component).

According to an exemplary embodiment, application of ultra-wideband (UWB) radio measurements enables decimeter-level accuracy for ranging and time-of-flight based systems. This accuracy is directly proportional to the bandwidth of the measurements. The proposed method combines consecutive UWB channel impulse response measurements to obtain a single result signal where the bandwidth of all sub-signals is added together, thus increasing ranging accuracy. Each sub-signal is comprised of an UWB sub-channel, where center frequency and bandwidth can be arbitrary. The signals are fitted tightly in frequency domain to obtain a coherent "stitch". The inter-band coherency for this stitch is dependent on i) the presence of a phase offset ii) the tightness of the sub-bands.

According to an exemplary embodiment, a combination of multiple sub-bands is described to extend the effective bandwidth. The sub-bands can also be taken arbitrarily from the pool of available channels.

FIG. 1 illustrates an RF device 100, according to an exemplary embodiment of the disclosure. The RF device 100 comprises a control device 110 (e.g. one or more processors) coupled (directly or remotely, e.g. wired or wireless) with a plurality of channels 120 (channel inputs). The RF device 100 is in this example an UWB radar device configured according to the IEEE standard. A transmitter is not shown in this example but of the receiver is illustrated by the input channels 120. The transmitter transmits one or more RF radar signals which is/are then reflected by a target. The reflected radar signals are then received by the channels of the receiver 120. Alternatively, RF signals from another entity can be received.

The receiver 120 comprises in this example two (sub-) channels: a first channel 121 with a first frequency band and a second channel 122 with a second frequency band. In this example, the base band channels 5 and 9 of the IEEE standard are applied. It should be noticed that these channels 121, 122 are non-adjacent to each other, i.e. there is a frequency gap in between. The first channel 121 is configured to receive a first signal, while the second channel 122 is configured to receive a second signal. The signals can be the same for the channels or different for each channel 121, 122. The first channel 121 measures a first channel response as a first channel impulse response and the second channel 122 measures a second channel response as a second channel impulse response. These channel impulse responses are then sent to the control device 110.

The control device 110 is configured to obtain said channel impulse responses (CIR) and to combine the first CIR and the second CIR by channel stitching 112 to obtain a combined channel (impulse) response 115, i.e. a combined spectrum, as the output. It can be seen in FIG. 1 that the channel stitching 112 is done based on the number of bands (n) and the center frequency ($f_{st}$): $n*f_{st}$, wherein $$f_{st} = f_{st}^{(1)} + \Delta B_i$$

In order not to lose information, the sampling rate can be scaled with the number of bands, when calculating the output sum, e.g. resampling $T_s \rightarrow T_s/N_B$.

Before performing the actual channel stitching 112, there is applied a calibration 111 to align the first CIR and the second CIR with each other. To perform such an alignment, the parameter (steering vector) $\varphi_0$ needs to be estimated. In the present case, a calibration base 130 is determined, which is in this example the most dominant peak (strongest multipath-component, at position $n_0$, $n_0 \rightarrow \max$) of the channel impulse responses which is chosen to estimate $\varphi_0$. Based on the calibration base 130, a steering towards said calibration base 130 is performed for the first CIR and the second CIR in order to obtain/correct a phase offset and a coherence between the CIRs.

In other words, a three-step processing can be applied: calibration (determine calibration base), steering (towards the calibration base, steering centers the phase of sub-bands to gain inter-band coherence) and stitching (combination). The shown formula (r_st) is an illustrative summary of all the three steps in one turn:

i) r_BB are the CIRs from single channels (in baseband),
ii) these get first the calibration phase shift phi_0 (obtained here from the strongest peak), and iii) then the steering (n_0*ΔB) (here position of strongest peak and distance of center frequencies), and
iii) finally the stitch (n*f_st) (linear phase to shift the band).

Figure 2:
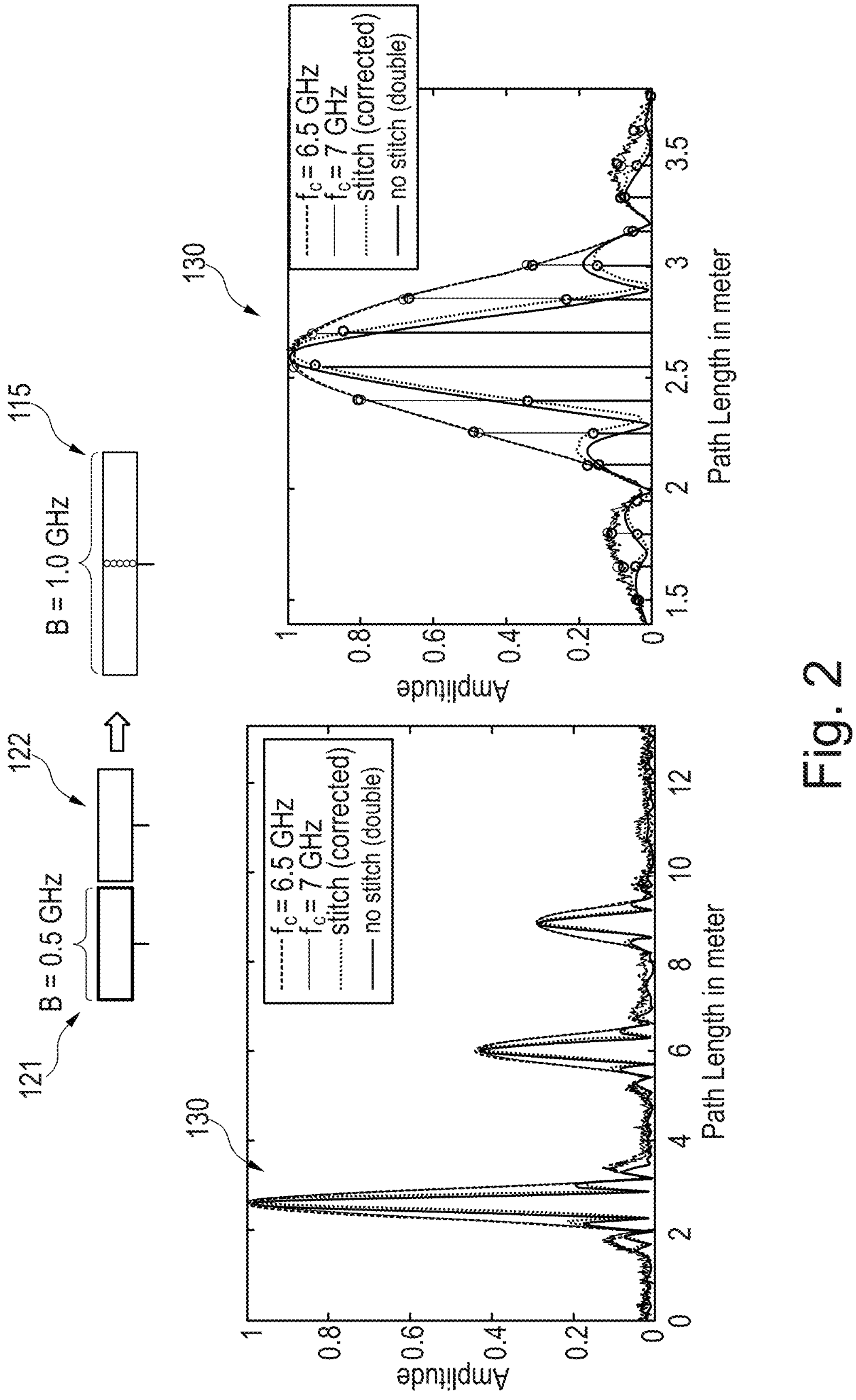
FIG. 2 compares different channel impulse responses, including the combination of two adjacent channels, according to exemplary embodiments of the disclosure.

FIG. 2 compares different channel impulse responses, including the combination of two adjacent channels, according to exemplary embodiments of the disclosure. On the left side, there is shown a CIR diagram with the amplitude indicated at the y-axis and the path length in meter indicated at the x-axis. Three peaks are visible in the CIR diagram, which can be associated e.g. with a target and/or a surface. The following CIRs are shown:

i) a CIR of a first (sub-) channel 121 with a center frequency at 6.5 GHz (bandwidth 500 MHZ), ii) a CIR of an adjacent second channel 122 with a center frequency at 7 GHz (bandwidth 500 MHz), iii) a combined CIR, whereby the first CIR and the second CIR have been calibrated and stitched together, iv) a single channel with double bandwidth (without stitching) to illustrate that the stitching can appropriately double the bandwidth.

The term “circular AWGN” refers to the noise model which is circular additive white gaussian noise to simulate a more realistic channel.

On the right side, there is shown a detailed view of the dominant peak 130 (strongest multipath component).

On top, it is schematically shown that the bandwidths of the two adjacent channels 121, 122 (each being 500 MHz) are combined by stitching to a combined bandwidth of 1 GHz, thereby effectively gaining the double bandwidth.

It can be seen that the combined (stitched) channel CIR has a significantly higher accuracy/resolution as the single channel CIRs. The dominant peak 130 can be used in this example as the calibration base to calibrate/align the first CIR and the second CIR.

Figures 3, 4:
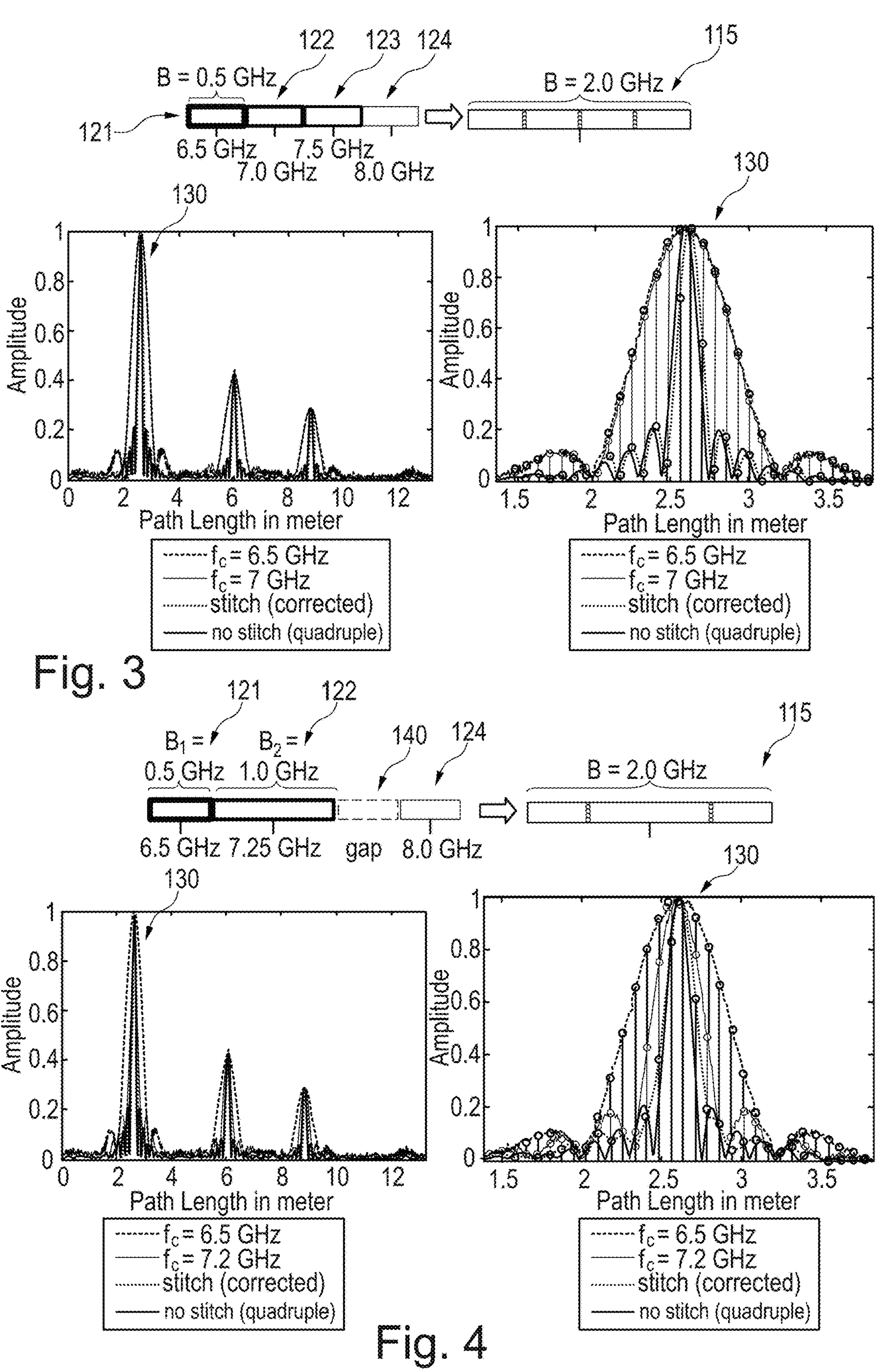
FIG. 3 compares different channel impulse responses, including the combination of four adjacent channels, according to exemplary embodiments of the disclosure.
FIG. 4 compares different channel impulse responses, including the combination of non-adjacent channels, according to exemplary embodiments of the disclosure.

FIG. 3 compares different channel impulse responses, including the combination of four adjacent channels, according to exemplary embodiments of the disclosure. On the left side, there is shown a CIR diagram with the amplitude indicated at the y-axis and the path length in meter indicated at the x-axis. Three peaks are visible in the CIR diagram, which can be associated e.g. with a target and/or a surface. The following CIRs are shown:

i) a CIR of a first (sub-) channel 121 with a center frequency at 6.5 GHz (bandwidth 500 MHz), ii) a CIR of an adjacent second channel 122 with a center frequency at 7 GHz (bandwidth 500 MHz), iii) a combined CIR, whereby the first CIR, the second CIR, a third CIR from a third channel 123 with a center frequency at 7.5 GHZ, and a fourth CIR from a fourth channel with a center frequency at 8 GHz have been calibrated and stitched together, iv) single channel with quadruple bandwidth (without stitching) to illustrate that the stitching can appropriately quadruple the bandwidth.

On the right side, there is shown a detailed view of the dominant peak 130 (strongest multipath component).

On top, it is schematically shown that the bandwidths of the four adjacent channels 121, 122, 123, 124 (each being 500 MHz) are combined by stitching to a combined bandwidth of 2 GHZ, thereby effectively gaining the quadruple bandwidth.

It can be seen that the combined (stitched) channel CIR has a significantly higher accuracy/resolution as the single channel CIRs. The dominant peak 130 can be used in this example as the calibration base to calibrate/align the first CIR, the second CIR, the third CIR, and the fourth CIR.

FIG. 4 compares different channel impulse responses, including the combination of four non-adjacent channels, according to exemplary embodiments of the disclosure. On the left side, there is shown a CIR diagram with the amplitude indicated at the y-axis and the path length in meters indicated at the x-axis. Three peaks are visible in the CIR diagram, which can be associated e.g. with a target and/or a surface. The following CIRs are shown:

i) a CIR of a first (sub-) channel 121 with a center frequency at 6.5 GHz (bandwidth 500 MHz), ii) a CIR of an adjacent second channel 122 with a center frequency at 7.25 GHz (bandwidth 1 GHz), iii) a combined CIR, whereby the first CIR, the second CIR, and a fourth CIR from a fourth channel with a center frequency at 8 GHz have been calibrated and stitched together, whereby a frequency gap 140 is present between the second frequency band and the fourth bandwidth, iv) single channel with quadruple bandwidth (without stitching) to illustrate that the stitching can appropriately quadruple the bandwidth.

On the right side, there is shown a detailed view of the dominant peak 130 (strongest multipath component).

On top, it is schematically shown that the bandwidths of the two adjacent channels 121, 122 (first and second channel) and the non-adjacent fourth channel 124 are combined by stitching to a combined bandwidth of 2 GHz, thereby effectively gaining the quadruple bandwidth.

It can be seen that the combined (stitched) channel CIR has a significantly higher accuracy/resolution as the single channel CIRs. The dominant peak 130 can be used in this example as the calibration base to calibrate/align the first CIR, the second CIR, and the fourth CIR.

Figure 5:
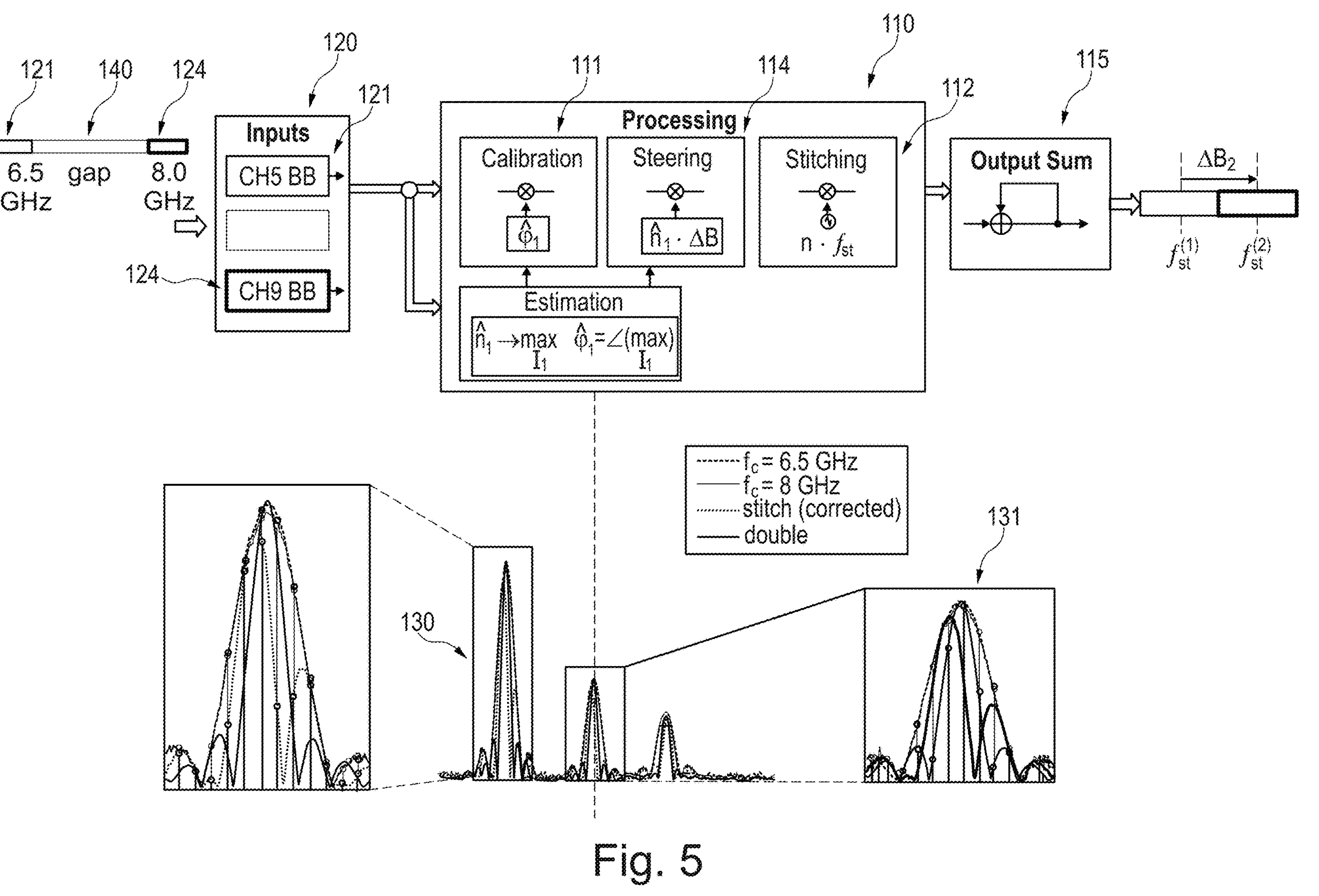
FIG. 5 illustrates the RF device in a configuration, wherein a target peak is selected as a calibration base, according to an exemplary embodiment of the disclosure.

FIG. 5 illustrates the RF device 100 (see FIG. 1) in a configuration, wherein a target peak 131 is selected as a calibration base instead of the dominant peak 130, according to an exemplary embodiment of the disclosure. In this example, where there is a gap 140 between the applied first channel 121 bandwidth and fourth channel 124 bandwidth. Having a closer look on the dominant peak 130 (left side), it can be seen a distortion, while the target peak 131 (right side) shows no distortion. Accordingly, the target peak 131 (region) can be determined with high accuracy/resolution, but not the dominant peak 130 (region). The described bandwidth doubling is hence achieved for a specific target tap (at the target peak 131 region).

Figure 6:
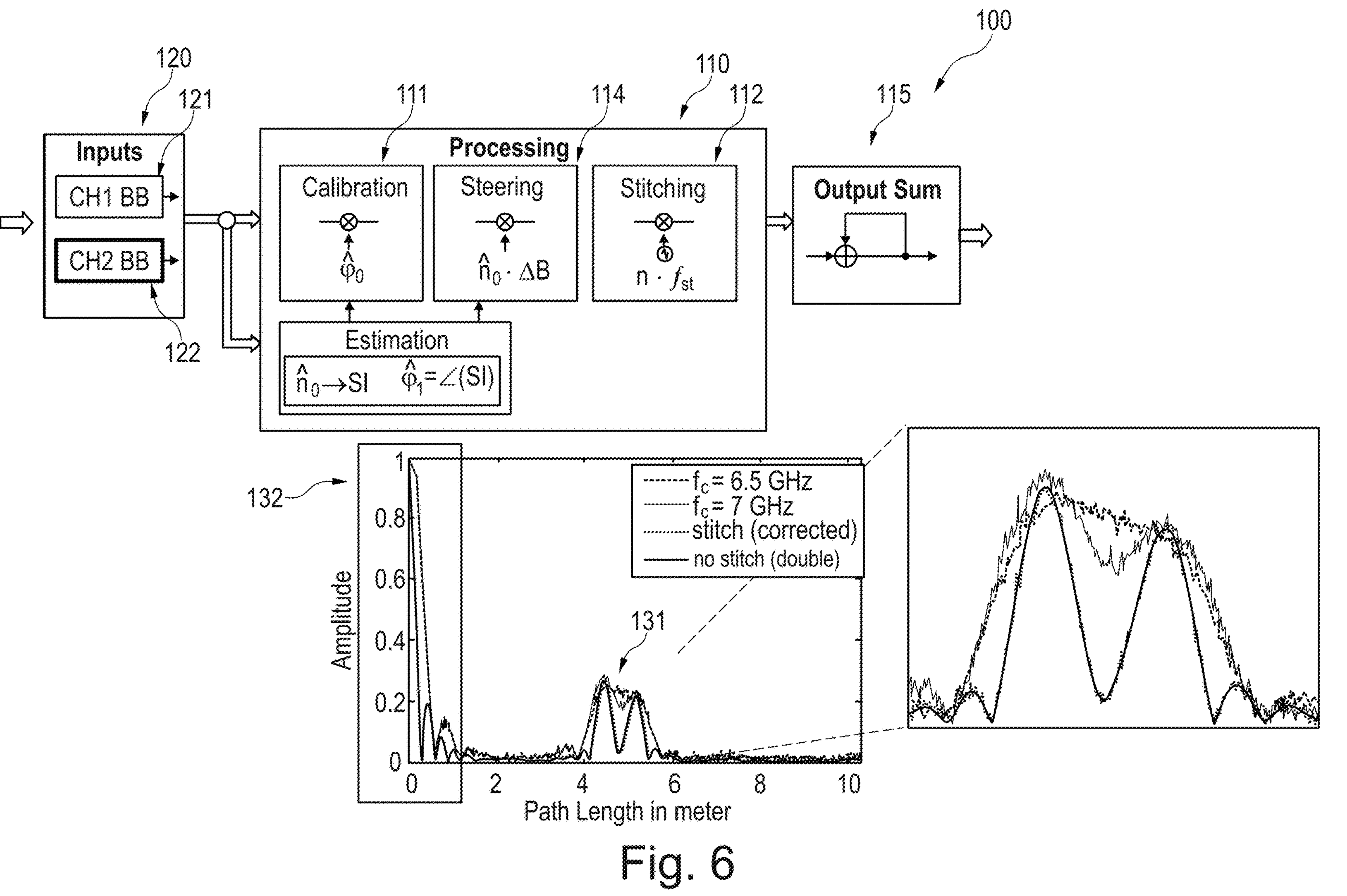
FIG. 6 illustrates the RF device in a configuration, wherein a self-interference peak is selected as a calibration base, according to an exemplary embodiment of the disclosure.

FIG. 6 illustrates the RF device 100 (see FIG. 1) in a configuration, wherein a self-interference peak 132 is selected as a calibration base 130, according to an exemplary embodiment of the disclosure. For this specific example, the RF device 100 is configured as a monostatic radar, wherein the transmitter and the receiver are co-located, i.e. arranged in the same entity. An interference between transmitter and receiver results in the (device-specific) self-interference peak 132 in each CIR. In this manner, the self-interference peak 132 can be used as the calibration base, and the calibration/steering can be done independent of the target. Thereby, for example the resolution of two or more (spatially close) targets can be improved.

Figure 7A:
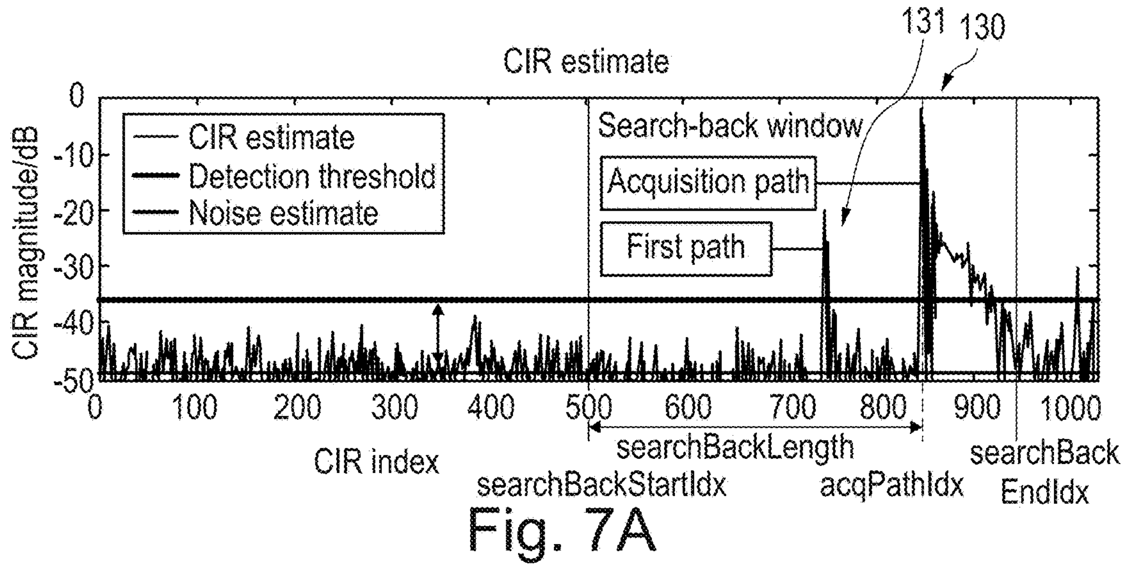
FIGS. 7A and 7B schematically illustrate performing steering and stitching, according to exemplary embodiments of the disclosure.
Figure 7B:
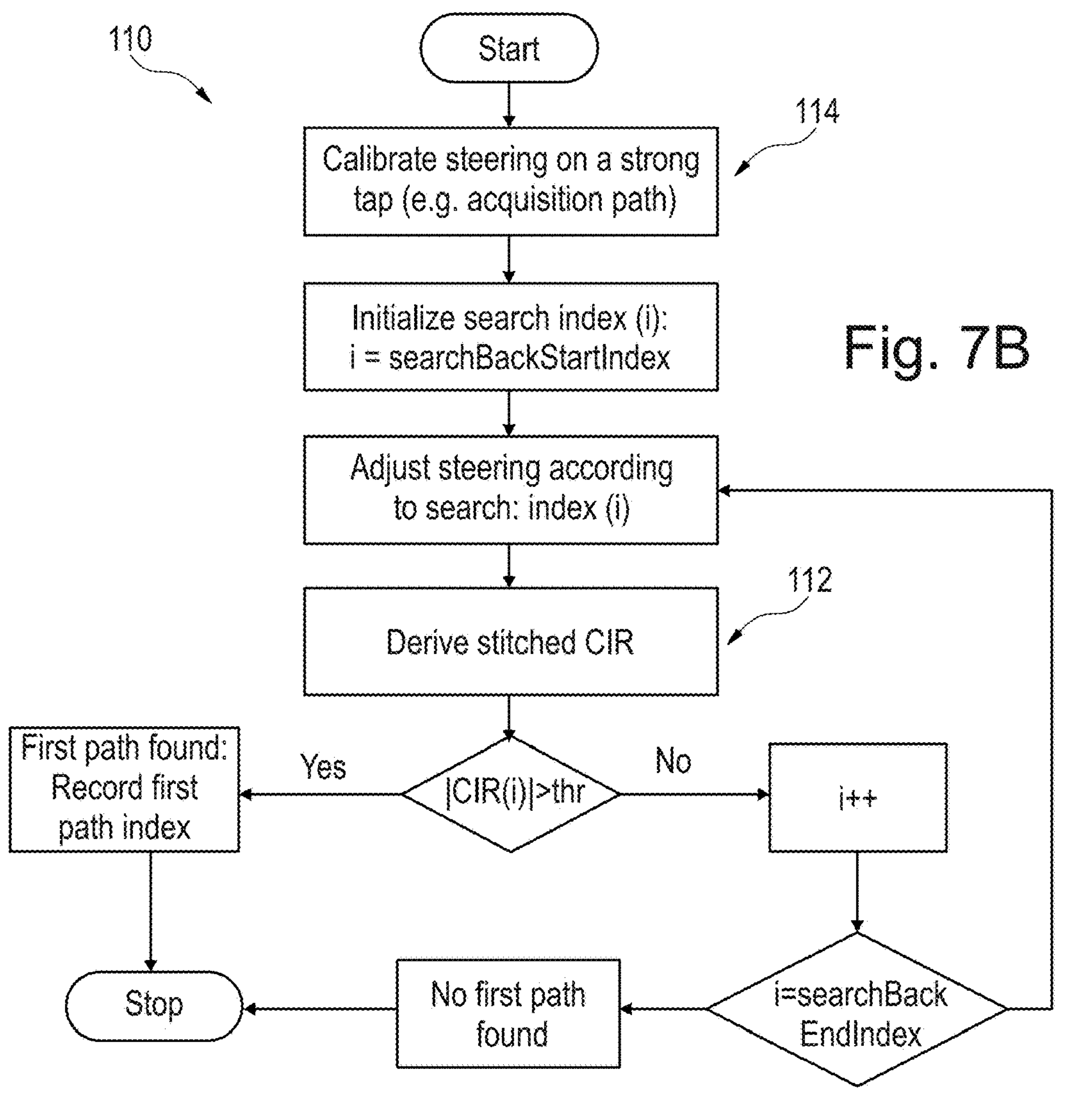

FIGS. 7A and 7B schematically illustrates an algorithm of performing steering 114 and stitching 112 to find the (true earliest) first path in case where the strongest peak (acquisition path) is not the first path, according to exemplary embodiments of the disclosure. Hereby, the acquisition path is the strongest component in the CIR, while the first path (first peak) is the physical earliest component, which may not necessarily be the strongest comment, e.g. due to line-of-sight blockage and/or diffuse multipath propagation. The basic idea of this algorithm comes from the effect seen in FIG. 5: steering towards the strongest peak (acquisition path) can make the target peak (first path) distorted and/or weaker. Following the algorithm shown, it is iterated over the CIR taps before the acquisition path and each time steer is done to the corresponding distance. When the first path is reached, then the distortion is resolved and the threshold should be surpassed.

This algorithm can be well suited for the case of spectral gaps, but it can also be used when there are no gaps because the initial steering to the acquisition peak can be not fully accurate and doing the iterations as described above might lead to the correct steering distance (d_0) and thus helps finding the true first path.

FIG. 7A: there is shown a CIR estimate, a detection threshold, and a noise estimate. Within a search-back window, it is shown the acquisition path and the first path.

FIG. 7B: shows schematically the above described first path search algorithm with respect to the CIR estimate for FIG. 7A. The steering coefficients are calibrated on a strong tap (acquisition path). Iteratively, steering coefficients are then adjusted to the first path search position, and the algorithm is stopped, when the first path is found.

Figure 8:
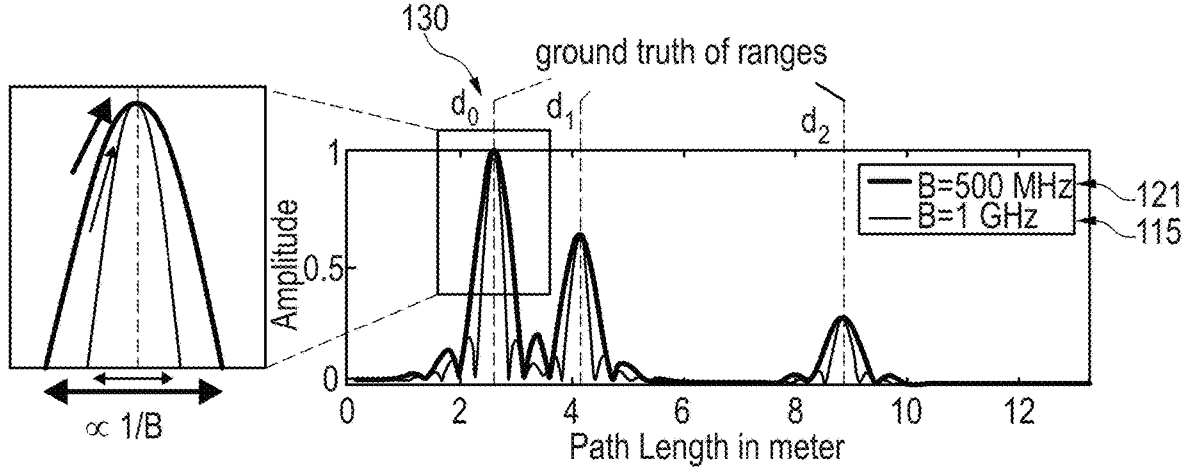
FIG. 8 illustrates a comparison of a channel impulse response from a conventional device and the RF device according to exemplary embodiments of the disclosure.

For FIG. 8, a conventional example has already been described above. However, according to the present disclosure, a bandwidth of B=1 GHz can be applied, and the resolution and accuracy can be clearly improved.

The invention claimed is:

1. A radio frequency (RF) device, comprising:
- a first channel configured to receive a first signal in a first frequency band;
- a second channel configured to receive a second signal in a second frequency band that is different from the first frequency band; and
- control circuitry configured to:
  - obtain a first channel response associated with the first channel using the received first signal;
  - obtain a second channel response associated with the second channel using the received second signal;
  - calibrate the first channel response and the second channel response by steering to a calibration base; and
  - combine the first channel response and second channel response by channel stitching to obtain a combined channel response;
- wherein the control circuitry is further configured to:
  - identify a peak from one of a group consisting of the first channel response and the second channel response;
  - define a calibration base window based on the identified peak; and
  - calibrate initial steering coefficients on the identified peak; and
  - iteratively adjust steering coefficients over the calibration base window to identify a first peak.

2. The device according to claim 1, wherein the first frequency band and the second frequency band are adjacent to each other or non-adjacent to each other.

3. The device according to claim 2, wherein there is a gap between the first frequency band and the second frequency band.

4. The device according to claim 1, wherein the device is an ultra-wide band (UWB) device.

5. The device according to claim 1, wherein the peak may include one selected from the group consisting of:
- a dominant peak;
- a most dominant peak;
- a dominant multipath component;

- a target peak; and
- a self-interference peak.

6. The device according to claim 5, wherein calibration is performed to correct at least:
- a constant phase offset, or
- a steering phase offset between the first channel response and the second channel response.

7. The device according to claim 5, wherein steering is performed to center a first phase of the first channel response and a second phase of the second channel response to obtain a coherence of the first channel response and the second channel response.

8. The device according to claim 1, wherein the control circuitry is further configured to:
- process the first channel response, the second channel response, or the combined channel response.

9. The device according to claim 1, comprising three or more channels.

10. The device according to claim 1, wherein the control circuitry is further configured to, in a case that in at least one selected from the group consisting of the first channel response and the second channel response, the first peak is not a strongest peak:
- define a calibration base window based on an identified strongest peak;
- and
- iteratively steer over the calibration base window to identify the first peak.

11. The device according to claim 1, further comprising:
- a receiver configured to receive the first signal and the second signal.

12. The device according to claim 1, comprising at least one of the following features:
- wherein the first channel response is a first channel impulse response (CIR);
- wherein the second channel response is a second CIR;
- wherein the first channel response is associated with a first spectrum;
- wherein the second channel response is associated with a second spectrum;
- wherein the combined channel response is associated with a combined spectrum.

13. A method of operating a radio frequency (RF) device, the method comprising:
- obtaining a first channel response associated with a received first signal at a first channel with a first frequency band;
- obtaining a second channel response associated with the received second signal at a second channel with a second frequency band,
- wherein the first frequency band and the second frequency band are different; calibrating the first channel response and the second channel response by steering to a calibration base;
- wherein calibrating the first channel response and second channel response includes:
  - identifying a peak from one of a group consisting of the first channel response and the second channel response;
  - defining a calibration base window based on the identified peak; and
  - calibrating initial steering coefficients on the peak; and
- combining the first channel response with the second channel response for obtaining a combined channel response, wherein combining comprises channel stitching.

14. The method according to claim 13, wherein the calibration base is associated with a target.

15. The method of claim 13 further comprising:

applying the combined channel response to determine a spatial characteristic.

16. The method of claim 13, further comprising, in case that in at least one of the group consisting of the first channel response and the second channel response, a first peak is not a strongest peak:

identifying the strongest peak;

defining a calibration base window based on an identified strongest peak; and iteratively steering over the calibration base window to identify the first peak.

17. The method of claim 13, wherein the first frequency band and the second frequency band have a frequency gap in between.

18. A radio frequency (RF) device, comprising:

a first channel configured to receive a first signal in a first frequency band;

a second channel configured to receive a second signal in a second frequency band that is different from the first frequency band; and control circuitry configured to:

obtain a first channel response associated with the first channel using the received first signal;

obtain a second channel response associated with the second channel using the received second signal;

calibrate the first channel response and the second channel response by steering to a calibration base; and combine the first channel response and second channel response by channel stitching to obtain a combined channel response;

wherein the control circuitry is further configured to:

identify a strongest peak, in one selected from the group consisting of the first channel response and the second channel response;

initially calibrate steering coefficients based on the identified strongest peak;

define a calibration base window based on the identified strongest peak; and iteratively adjust steering coefficients over the calibration base window to identify a first peak.

19. The device according to claim 18, wherein calibration is performed to correct at least:

a constant phase offset; and a steering phase offset between the first channel response and the second channel response.

20. The device according to claim 19, wherein there is a gap between the first frequency band and the second frequency band.

* * * * *